Jan. 3, 1950
H. E. ORSER
2,493,546
MULTIPLE VIEW SAFETY MIRROR
Filed March 24, 1948
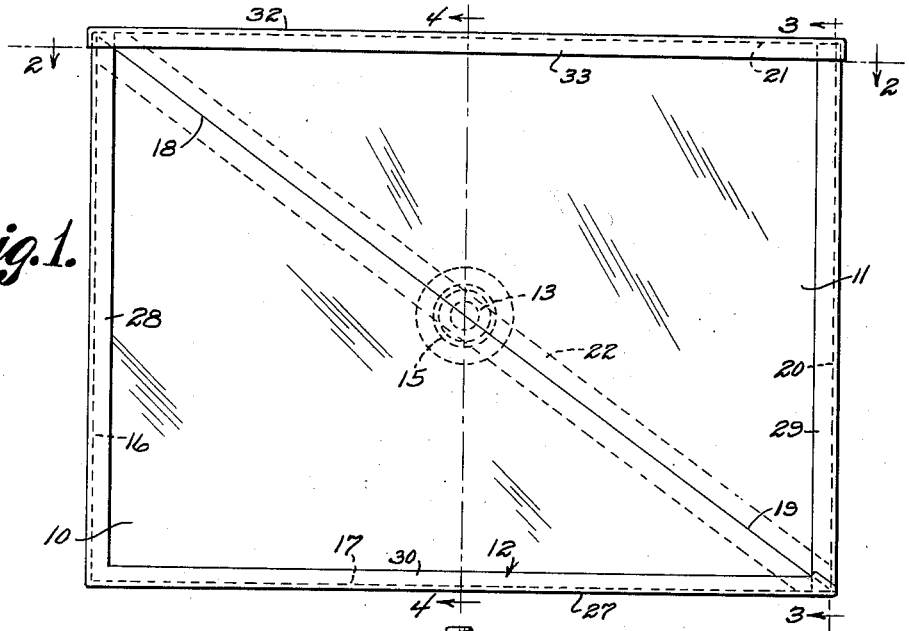
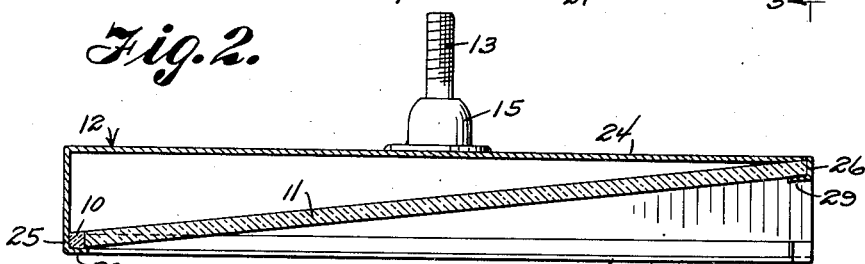
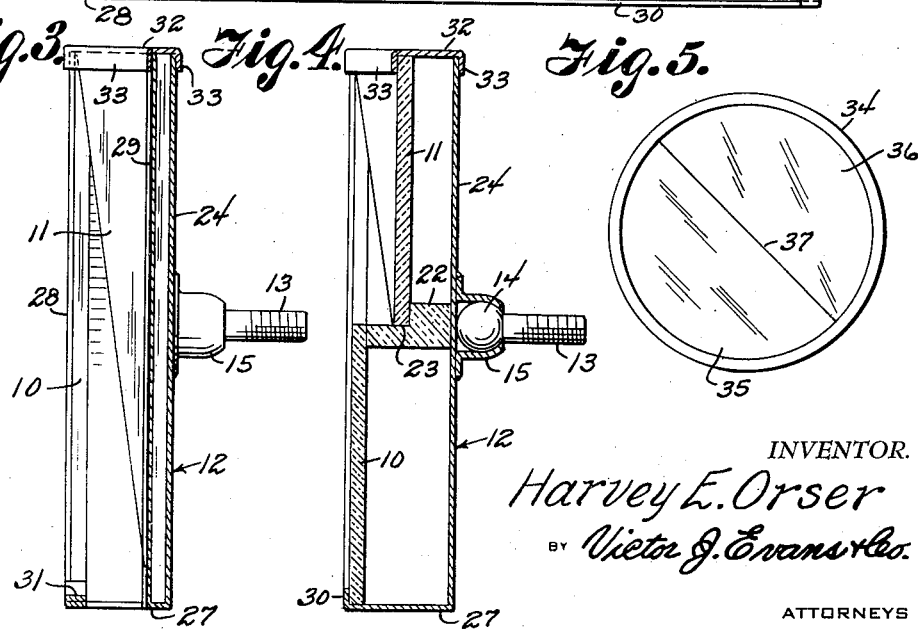
INVENTOR.
Harvey E. Orser
BY Victor J. Evans & Co.
ATTORNEYS Patented Jan. 3, 1950

2,493,546

UNITED STATES PATENT OFFICE 2,493,546

MULTIPLE VIEW SAFETY MIRROR

Harvey E. Orser, Pontiac, Mich.

Application March 24, 1948, Serial No. 16,723

2 Claims. (Cl. 88—87)

This invention relates to driving mirrors for motor vehicles, and in particular a combination rear view and side view mirror wherein a straight mirror is combined with a sloping mirror, and the two mirrors are combined in a common frame with the intersecting edges thereof diagonally disposed across the frame.

The purpose of this invention is to provide a rear view mirror that provides full vision of an approaching vehicle and in which the vehicle may be readily followed until it is in such a position that it may be observed without the aid of a mirror.

Various combinations of mirrors have been used with one on the windshield and one projecting at the side of the body or with reflecting wings at the sides of the rear view mirror, but as so many attachments or devices have been added to motor vehicles and particularly pleasure cars extensions and particularly additional mirrors or devices are objectionable. With this thought in mind this invention contemplates forming the usual rear view mirror so that sloping surfaces may be incorporated therein that will compensate for the usual side view mirror so that approaching vehicles may be followed around the side of the vehicle with a single combination or multiple view mirror.

The object of this invention is, therefore, to shape the reflecting surfaces of the usual rear view mirror so that clear and unobstructed vision through the rear and side of the vehicle is obtained.

Another object of the invention is to provide a combination rear and side view mirror that may readily be mounted in a convenient position in a motor vehicle and that may readily be adjusted to the convenience of the operator.

A further object of the invention is to provide a combination or multiple view mirror for motor vehicles which is of a simple and economical construction.

With these and other objects and advantages in view the invention consists of the new and novel combination, construction, and arrangement of parts as hereinafter more fully described, set forth in the claims appended hereto, and disclosed in the accompanying drawings, forming part hereof, wherein:

Figure 1 is a view showing a front elevation of the improved combination mirror.

Figure 2 is a sectional plan through the upper end of the mirror taken on line 2—2 of Figure 1.

Figure 3 is a vertical section through one end of the mirror taken on line 3—3 of Figure 1.

Figure 4 is a similar section taken on line 4—4 of Figure 1.

Figure 5 is a view similar to that shown in Figure 1 illustrating a modification wherein the mirror is formed circular-shaped instead of rectangular-shaped.

Referring now to the drawings wherein like reference characters denote corresponding parts the combination mirror of this invention includes a straight mirror 10, an inclined mirror 11, a frame 12, and a stud 13 which is formed with a ball 14 at one end that is frictionally held in a socket 15 on the back of the frame 12 providing a swivel joint.

In the design shown the straight mirror 10 is formed with a vertical edge 16 which is perpendicular to the lower edge or base 17 and the ends of the edge 16 and base 17 are connected by a diagonal edge 18. The mirror 11 is also flat and this is formed with a diagonal lower edge 19 that corresponds with the edge 18 of the mirror 10, a vertical edge 20, and an upper edge 21. The adjoining diagonal edges of the mirrors are held in assembled relation by a support 22 as shown in Figure 4 and also as shown in dotted lines in Figure 1. The support is provided with a step 23, which at the center, is set back as shown in Figure 4.

The frame 12 is formed with a back plate 24, the ends and bottom of which extend forward providing sides 25 and 26, and a bottom 27, respectively, and the side 25 is provided with a flange 28, the side 26 with a flange 29, and the bottom 27, with a flange 30. The flanges 29 and 30 are connected forming a horizontal strip 31 as shown in Figure 3. The upper end of the frame 12 is provided with a cover 32 which is formed with downwardly disposed flanges 33 that overlap the upper edges of the frame and upper mirror.

In the design shown in Figure 5 the mirror is formed with a circular frame 34 with a straight mirror 35 similar to the mirror 10, and an inclined mirror 36 similar to the mirror 11, and the edges of the mirrors meet on a diagonal line 37, as shown. It will be understood that the frame and mirrors may be of any suitable shape or design.

With the combination or multi-view mirror formed in this manner it may be installed by the threaded stud 13, similar to the usual rear view mirror, on the upper edge of the windshield of a motor vehicle, and by glancing in the mirror an approaching vehicle will show therein in the usual manner, and with the portion of the mirror sloping the line of sight may travel or follow the vehicle around the side of the vehicle in which the combination mirror is positioned. It will be understood that the improved mirror may be used single, or where traffic passes on both sides of the vehicle two of the combination mirrors may be used together with the upper mirror of one sloping in one direction and the corresponding mirror of the other sloping in the opposite direction.

It will be understood that other modifications may be made in the design and arrangement of the parts without departing from the spirit of the invention.

What is claimed is:

1. In a combination rear and side view mirror for motor vehicles, the combination which comprises a flat triangular shaped mirror having a base with a straight side, the length of which is less than that of the base, and having a hypothenuse connecting the ends of the base and side, a complementary flat triangular shaped mirror having a base, side and a hypothenuse corresponding with like elements of the former mirror, a rectangular shaped frame the sides and ends of which correspond with and receive the bases and sides of the mirrors, respectively, with the positions of the mirrors reversed whereby the meeting edges of the mirrors correspond with the hypothenuse of both of said mirrors, and one of said mirrors is positioned an acute angle in relation to the other with the sides of the mirrors in spaced parallel planes, and the displacement of the diagonal edge of one mirror in relation to the other varies with the distance increasing from one side of the mirror to the other, whereby with the mirror positioned on a windshield of a vehicle both of said mirrors reflect objects through a rear window of the vehicle and the angularly positioned mirror also reflects objects through windows at one side of the vehicle.

2. In a combination rear and side view mirror for a motor vehicle, the combination which comprises a flat lower mirror having a diagonally disposed upper edge and a complementary upper mirror also having a diagonally disposed edge positioned in meeting relation with the diagonally disposed upper edge of the former mirror, said upper mirror positioned in a plane positioned at an acute angle to the plane of the lower mirror with the point at the upper edge of the diagonally disposed edge in the same plane of that of the lower mirror and with the opposite side positioned behind the point at the lower end of the diagonally disposed edge of the lower mirror whereby the displacement of the upper mirror behind the lower mirror varies with the amount of displacement increasing throughout the width of the mirrors.

HARVEY E. ORSER.

REFERENCES CITED

The following references are of record in the file of this patent:

UNITED STATES PATENTS

| Number | Name | Date |
|---|---|---|
| D. 74,625 | Rivard | Mar. 6, 1928 |
| 1,837,085 | Van Gelder | Dec. 15, 1931 |
| 1,925,666 | Kerns | Sept. 5, 1933 |